(12) United States Patent
Miziolek et al.

(10) Patent No.: US 12,450,561 B2
(45) Date of Patent: Oct. 21, 2025

(54) MACHINE LEARNING MODEL FOR DYNAMICALLY BOOSTING ORDER DELIVERY TIME

(71) Applicant: Maplebear Inc., San Francisco, CA (US)

(72) Inventors: Konrad Gustav Miziolek, San Francisco, CA (US); Parikshit Verma, College Station, TX (US)

(73) Assignee: Maplebear Inc., San Francisco, CA (US)

( * ) Notice: Subject to any disclaimer, the term of this patent is extended or adjusted under 35 U.S.C. 154(b) by 314 days.

(21) Appl. No.: 18/158,368

(22) Filed: Jan. 23, 2023

(65) Prior Publication Data
US 2024/0249238 A1    Jul. 25, 2024

(51) Int. Cl.
*G06Q 10/087*    (2023.01)
*G06N 5/022*    (2023.01)

(52) U.S. Cl.
CPC .......... *G06Q 10/087* (2013.01); *G06N 5/022* (2013.01)

(58) Field of Classification Search
CPC ............................ G06Q 10/087; G06N 5/022
See application file for complete search history.

(56) References Cited

U.S. PATENT DOCUMENTS

| | | | | |
|---|---|---|---|---|
| 8,001,017 B1 * | 8/2011 | Franco | ............... | G06Q 30/0601 705/28 |
| 9,959,562 B1 * | 5/2018 | Ackerman | ......... | G06Q 30/0631 |
| 10,133,995 B1 * | 11/2018 | Reiss | ..................... | G06Q 50/01 |
| 10,713,706 B1 * | 7/2020 | Thankachan | .......... | G06N 20/20 |
| 11,144,866 B2 * | 10/2021 | Swartz | ................... | G06Q 50/26 |
| 11,176,513 B1 * | 11/2021 | Park | .................... | G06Q 30/0639 |
| 11,507,988 B1 * | 11/2022 | Lee | ....................... | G06Q 20/085 |
| 11,875,394 B2 * | 1/2024 | Faturechi | ........... | G06Q 30/0202 |
| 11,940,286 B1 * | 3/2024 | O'Neil | ............. | G06Q 10/08355 |
| 12,198,216 B2 * | 1/2025 | Shang | ................ | G06Q 30/0211 |
| 2006/0136237 A1 * | 6/2006 | Spiegel | .............. | G06Q 10/0835 705/13 |
| 2007/0192200 A1 * | 8/2007 | Weng | ...................... | G06Q 30/06 705/26.81 |
| 2013/0246207 A1 * | 9/2013 | Novak | ............... | G06Q 30/0641 705/26.2 |

(Continued)

FOREIGN PATENT DOCUMENTS

JP    2012530974 A    * 12/2012 .......... G06Q 10/087

*Primary Examiner* — Ashford S Hayles
(74) *Attorney, Agent, or Firm* — Fenwick & West LLP

(57) ABSTRACT

A method or a system for using machine learning to dynamically boost order delivery time. The system receives an order associated with a delivery time and a compensation value. The system applies a machine-learning model to an order to predict an amount of lateness time that an order will be fulfilled late. The system then determines a lateness value based in part on the predicted amount of lateness time. The lateness value indicates a penalty caused by the predicted amount of lateness time. For each of a plurality of proposed boost amounts for the compensation value, the system determines an uplift, indicating a reduction of the lateness value caused by the boost amount. The system then selects a boost amount from the plurality of boost amounts based in part on the determined uplifts, causing the order to be accepted sooner to thereby boost order delivery time.

20 Claims, 10 Drawing Sheets

(56) References Cited

U.S. PATENT DOCUMENTS

| | | | |
|---|---|---|---|
| 2015/0242918 A1* | 8/2015 | Mccarthy | G06Q 30/0635 |
| | | | 705/26.43 |
| 2015/0262121 A1* | 9/2015 | Riel-Dalpe | G06Q 50/12 |
| | | | 705/15 |
| 2016/0328781 A1* | 11/2016 | Patel-Zellinger | |
| | | | G06Q 30/0635 |
| 2017/0116566 A1* | 4/2017 | Walton | G06Q 10/087 |
| 2018/0109908 A1* | 4/2018 | Swanson | H04W 4/20 |
| 2018/0232755 A1* | 8/2018 | Li | G06Q 10/087 |
| 2018/0349851 A1* | 12/2018 | Gupta | G06Q 10/08355 |
| 2018/0349872 A1* | 12/2018 | Ahmed | G07G 1/0036 |
| 2019/0066046 A1* | 2/2019 | Nathani | G06N 7/01 |
| 2019/0266557 A1* | 8/2019 | Berk | G06Q 50/12 |
| 2019/0340561 A1* | 11/2019 | Rajkhowa | G06Q 10/063114 |
| 2019/0378080 A1* | 12/2019 | Srinivasan | G06Q 20/208 |
| 2019/0392387 A1* | 12/2019 | Quan | G06Q 10/0838 |
| 2020/0005198 A1* | 1/2020 | Nazerzadeh | G06Q 30/0205 |
| 2020/0143319 A1* | 5/2020 | Fu | G06N 5/01 |
| 2020/0160264 A1* | 5/2020 | Silverman | G06Q 10/06315 |
| 2020/0167812 A1* | 5/2020 | Zhang | G06N 5/04 |
| 2020/0175472 A1* | 6/2020 | Kaiser | G06Q 30/0641 |
| 2020/0250613 A1* | 8/2020 | Nanavati | G06Q 10/0835 |
| 2020/0342402 A1* | 10/2020 | Rajkhowa | G06Q 10/08355 |
| 2020/0342558 A1* | 10/2020 | Rajkhowa | G06Q 10/0635 |
| 2021/0065098 A1* | 3/2021 | Park | G06Q 10/087 |
| 2021/0081840 A1* | 3/2021 | Darmour | G06F 18/22 |
| 2021/0158272 A1* | 5/2021 | Barr | G06Q 10/087 |
| 2021/0192292 A1* | 6/2021 | Zhai | G06N 20/00 |
| 2021/0233024 A1* | 7/2021 | Patel | G06Q 10/047 |
| 2021/0248530 A1* | 8/2021 | Garcia-Brosa | G06Q 50/12 |
| 2021/0256549 A1* | 8/2021 | Ren | G06N 20/00 |
| 2022/0083905 A1* | 3/2022 | O'Hara | G06N 20/00 |
| 2022/0092530 A1* | 3/2022 | Newell | G06Q 10/0833 |
| 2022/0101260 A1* | 3/2022 | Karri | G06Q 10/08355 |
| 2022/0115105 A1* | 4/2022 | Nieten | G16H 40/20 |
| 2022/0139518 A1* | 5/2022 | Shawver | G06Q 10/06312 |
| | | | 705/2 |
| 2022/0163336 A1* | 5/2022 | Rahematpura | G01C 21/3896 |
| 2022/0188906 A1* | 6/2022 | Lacy | G06Q 30/0641 |
| 2023/0230023 A1* | 7/2023 | Khaleghi | G06Q 10/0833 |
| | | | 705/7.25 |
| 2023/0245037 A1* | 8/2023 | Zhao | G06N 20/20 |
| | | | 705/333 |
| 2023/0267400 A1* | 8/2023 | Nicotera | G06N 3/09 |
| | | | 705/7.25 |
| 2023/0289840 A1* | 9/2023 | Li | G06Q 50/40 |
| 2023/0316215 A1* | 10/2023 | Kwatra | G06Q 30/0208 |
| | | | 705/330 |
| 2024/0232929 A1* | 7/2024 | Nguyen | G06Q 30/0222 |
| 2025/0013911 A1* | 1/2025 | Agrawal | G06N 20/00 |
| 2025/0148487 A1* | 5/2025 | Siebel | G06Q 30/0202 |

* cited by examiner

MACHINE LEARNING MODEL FOR DYNAMICALLY BOOSTING ORDER DELIVERY TIME

BACKGROUND

An online concierge system is an online platform that connects customers and retailers. A customer can place an order for purchase items, such as groceries, from participating retailers via the online concierge system. A shopper (or a fulfillment agent) picks the ordered items at the retailer and then delivers the order to the customer's address. The shopper is then compensated for fulfilling the order.

Notably, each order is different. For example, each order includes a different number of a variety of items, and each order relates to a different travel path and distance from a retailer to a customer's address. The online concierge system determines a compensation value for the order based on these variables. The online concierge system may also group multiple orders into a batch and determine a compensation value for the batch. The compensation value is the value that a shopper will be compensated for fulfilling the order or the batch of orders. For example, when a new order or a batch of orders is received, the online concierge system determines a compensation value for the order and publishes the order and its compensation value for shoppers to view. Each shopper can decide whether they want to accept the order or the batch. The shopper who accepts the order will fulfill the order and be compensated for the compensation value.

Orders are often associated with a time window by which the orders are scheduled to be delivered. Late orders are problematic, since they result in a bad experience for the customers and hence may harm future business of the online concierge system. Orders can be late for a variety of reasons, one of which is that an order may be presented to shoppers who decide not to accept the order. A shopper is more likely to accept an order if the compensation amount is higher, which tends to decrease the likelihood of late orders, whereas pricing compensation for an order too low could result in a higher likelihood of a late order. But the increased compensation imposes a higher cost on the online concierge system. Predicting how compensation may affect the likelihood of a late order is a difficult task, as it involves a large number of variables in a complex system, including future behaviors by shoppers.

SUMMARY

The principles described herein solve the above-described problem by repeatedly predicting an amount of time that an order will be fulfilled late, and dynamically boosting a compensation value of the order based on the prediction. One or more embodiments include a method or a system for dynamically boosting a compensation value of an order. The system receives an order for fulfillment from a client device of a customer. The order is associated with a delivery time by which the order is to be fulfilled. The system sends the order and a compensation value for fulfilling the order to a client device of each of one or more fulfillment agents. The system repeatedly predicts an amount of lateness time that the order will be fulfilled late. The predicting includes applying a trained model to the order wherein the trained model is configured to receive input features associated with the order and input features associated with the one or more fulfillment agents to output a predicted time past the delivery time that the order will be fulfilled.

The system then determines a lateness value based in part on the predicted amount of lateness time. The lateness value indicates a penalty caused by the predicted amount of lateness time. The system also proposes a plurality of boost amounts for the compensation value. For each of the plurality of proposed boost amounts, the system determines an uplift in the determined lateness value. Determining the uplift includes predicting a revised amount of lateness time that the order would be delivered late if the one or more fulfillment agents were offered the boost amount in addition to the compensation value, determining a revised lateness value based on the predicted revised amount of lateness time, and determining an uplift of the boost amount by comparing the revised lateness value with the previously determined lateness value. The system then selects a boost amount from the plurality of boost amounts based on the determined uplifts, and resends the order and a modified compensation value increased by the selected boost amount to the client device of each of one or more fulfillment agents, causing the order to be accepted sooner by a fulfillment agent to thereby boost order delivery time.

Figure 1:
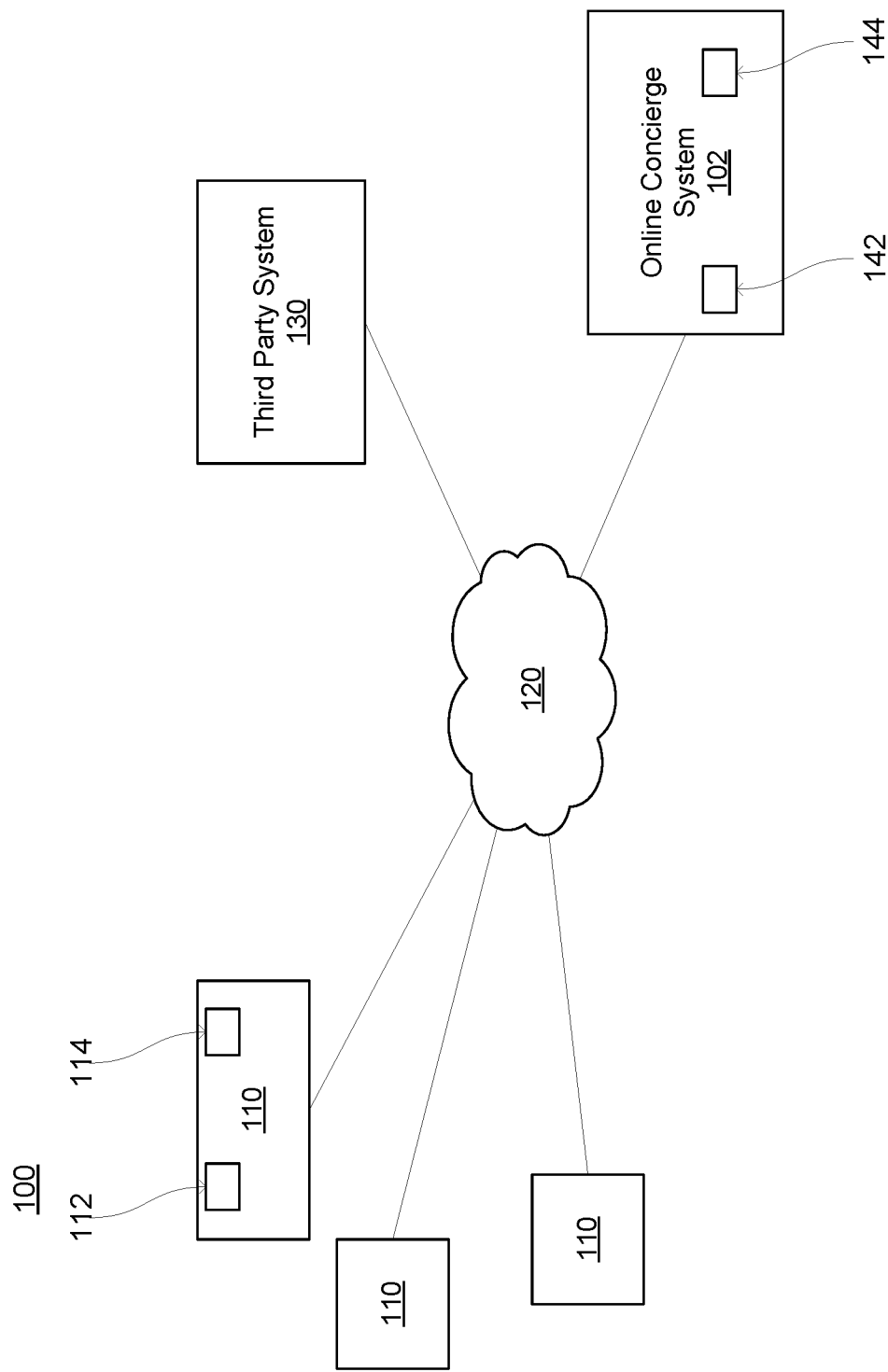
FIG. 1 is a block diagram of a system environment in which an online system, such as an online concierge system, operates, according to one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

An online concierge system is an online platform that connects customers and retailers. A customer can place an order for purchase items, such as groceries, from participating retailers via the online concierge system. A shopper (or a fulfillment agent) picks the ordered items at the retailer and then delivers the order to the customer's address. The shopper will be compensated for fulfilling the order.

Notably, each order is different. For example, each order includes a different number of a variety of items, and a distance between a customer's address and a retailer is also different for each order. The online concierge system determines a compensation value for the order. Alternatively, the online concierge system groups multiple orders into a batch, and determines a compensation value for the batch. The compensation value is the value that a shopper will be compensated for fulfilling the order or the batch of orders. For example, when a new order or a batch of orders is received, the online concierge system determines a compensation value for the order and publishes the order and its compensation value for shoppers to view. Each shopper can decide whether they want to accept the order or the batch. The shopper who accepts the order will fulfill the order and be compensated for the compensation value.

However, from time to time, the online concierge system might misprice an order or a batch, which could result in the compensation value being undesirable for the order. This would cause the order not to be accepted by a shopper timely, and fulfillment of the order be delayed. The principles described herein include using machine learning to optimize return on investment (ROI) of increasing a compensation value for an order or a batch, such that an online concierge system would compensate a shopper considering both a cost and a benefit of increasing the compensation value. For clarity, the following descriptions will be focused on a per-order compensation scheme, although the same principles are applicable to a per batch compensation scheme.

In some embodiments, a machine learning model is trained at per order level and on a frequent cadence (such as minutely). The machine learning model is trained to predict an expected lateness of an order given the current compensation value, other order characteristics, and a surrounding market place context. The machine learning model also predicts an expected lateness of the order given an increase in the compensation value, and uses an uplift framework to determine the expected difference in the lateness of applying a given increase in the compensation value. This uplift modeling may be accomplished through various machine learning algorithms, including (but not limited to) XGBoost.

A reduction in lateness is then translated to an expected value or benefit to the online concierge system. The value may stem from a combination of factors, which can be determined in either an online or offline fashion. These factors may include (but are not limited to) an expected reduction in appeasement cost, an expected increase in a customer lifetime value, an incremental availability that the online concierge system may show customers in a short-term due to low order lateness, and other efficiencies resulting from lower aggregate lateness in the marketplace. Given a return and a cost, such as lateness reductions by applying cost increases of various magnitudes, the online concierge system can choose a highest ROI option and directly increases the compensation value of the order that shoppers see in an order list.

When an order is received, the online concierge system determines a compensation value based on many factors, such as shopper effort (e.g., driver distance from the retailer store or warehouse to the customer, a number of items, etc.), day of the week, time of the day, etc. The initially determined compensation value may also be called a "base compensation value." Additional variable pay may be introduced through other mechanisms, such as additional incentives.

The online concierge system may misprice a given order for a variety of reasons, such as inaccuracy in predicting the effort involved for the order, uncertainty around the tip amount set by the customer (e.g., deliveries with no tip may be unattractive to shoppers, but the online concierge system may not directly observe the tip value for compensation value decisions), a prevailing supply state in a given market, etc. In particular, if a compensation value of an order is underpriced, i.e., is below a target earnings rate for shoppers on the platform, it may not be accepted by shoppers, who favor orders that are not mispriced (or are overpriced).

The principles described herein provide an on-demand acceptance boost mechanism for increasing a compensation value of a specific order based on observable and/or predicted signals. An order that has a high time-to-accept by shoppers is at risk of running late. This may represent a poor customer experience. Thus, an online concierge system is willing to increase the compensation value to prevent such a situation. The effect of increasing the compensation value often can result in a beneficial outcome, such as (1) potentially avoiding a late delivery, which may have a direct appeasement cost but also represents a negative customer experience, and (2) downstream effects on other real-time orders, e.g., the online concierge system can use the proportion of late deliveries to determine delivery availability for customers currently checking out their orders. The online concierge system can modify the estimated delivery time based on the proportion of late deliveries. The decreased lateness also lowers the estimated delivery time, and increases the conversion rate. There are also long-term benefits, such as an increased customer retention rate.

In particular, the machine learning model described herein addresses at least the following problems: (1) what is an expected reduction in a particular amount of lateness time if a compensation value of an order is boosted by a particular boost amount, (2) what is an expected short-term and long-term benefit of reducing the particular amount of lateness time, and (3) what is the ROI-optimal boost amount by which to increase the compensation value based on (1) and (2). Additional details associated with the online concierge system are described below with respect to FIGS. 1-8.

System Architecture

FIG. 1 is a block diagram of a system environment 100 in which an online system, such as an online concierge system 102 as further described below in conjunction with FIGS. 2 and 3, operates. The system environment 100 shown in FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one or more embodiments, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one or more embodiments, a client device 110 executes an application allowing a user of the client device 110 to interact with the online concierge system 102. For example, the client device 110 executes a customer mobile application 206 or a shopper mobile application 212, as further described below in conjunction with FIGS. 6A and 6B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 6A and 6B, respectively.

The client devices 110 are configured to communicate via the network 120, which may comprise any combination of local area and/or wide area networks, using both wired and/or wireless communication systems. In one or more embodiments, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one or more embodiments, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described above in conjunction with FIGS. 2-8. For example, the memory 144 has instructions encoded thereon that, when executed by the processor 142, cause the processor 142 to predict an amount of lateness time that an order will be fulfilled late, determines a lateness value based in part on the predicted amount of lateness time, an select a boost amount from a plurality of boost amount, causing the order to be accepted soon by a fulfillment agent. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-8, and may include specific computing components such as processors, memories, communication interfaces, and/or the like.

System Overview

Figure 2:
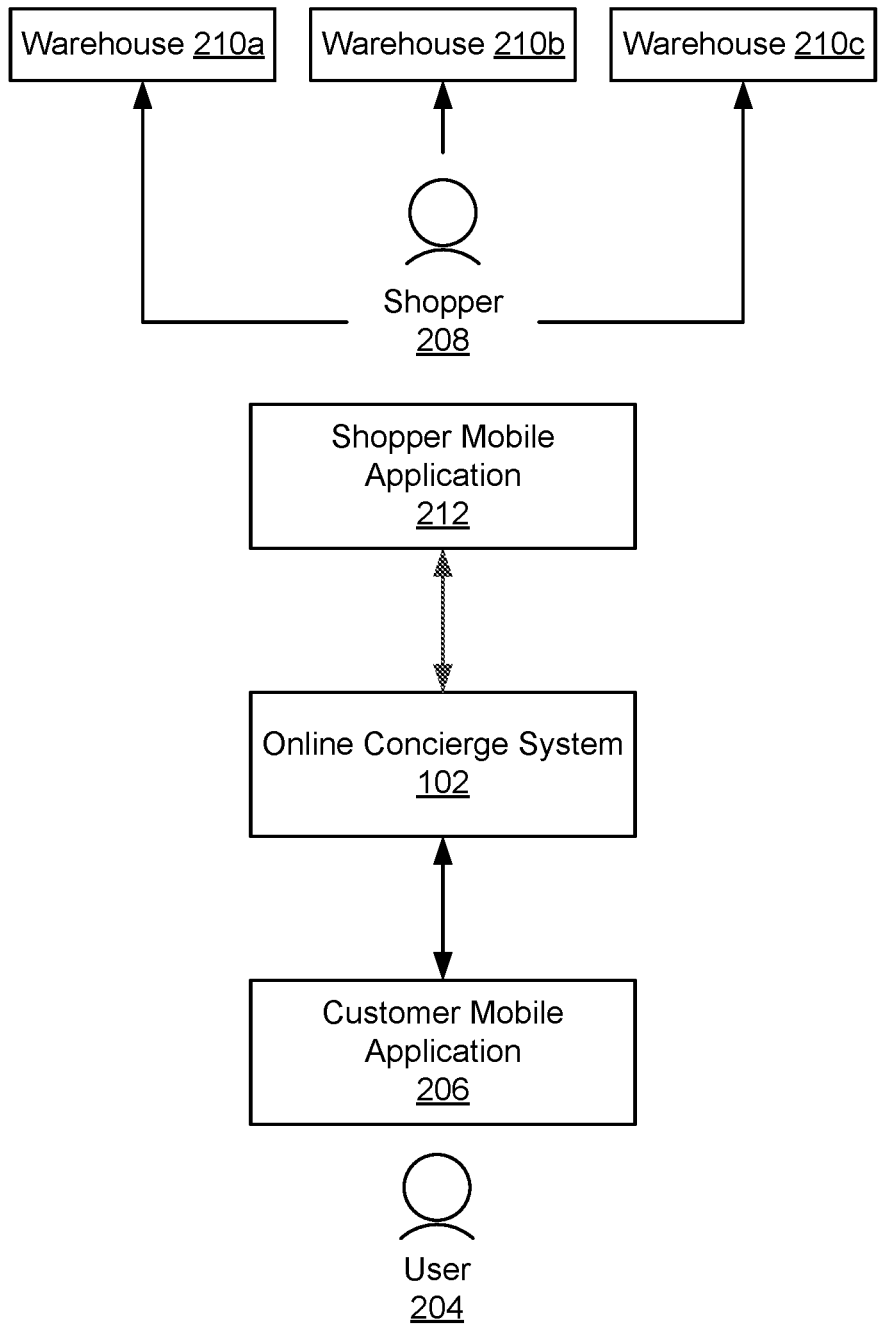
FIG. 2 illustrates an environment of an online shopping concierge service, according to one or more embodiments.

FIG. 2 illustrates an environment 200 of an online platform, such as an online concierge system 102, according to one or more embodiments. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. Each order is associated with a delivery time, by which the order is to be fulfilled. Each order is also associated with a compensation value, for which a shopper who fulfills the order will be compensated. The shopper 208 reviews the received orders and decides whether he/she wants to accept a particular order.

After the shopper 208 accepts an order, the shopper 208 travels between a warehouse and a delivery location (e.g., the user's home or office). A shopper 208 may travel by car, truck, bicycle, scooter, foot, or other modes of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one or more embodiments, shoppers 208 make use of a shopper mobile application 212 which is configured to interact with the online concierge system 102.

Figure 3:
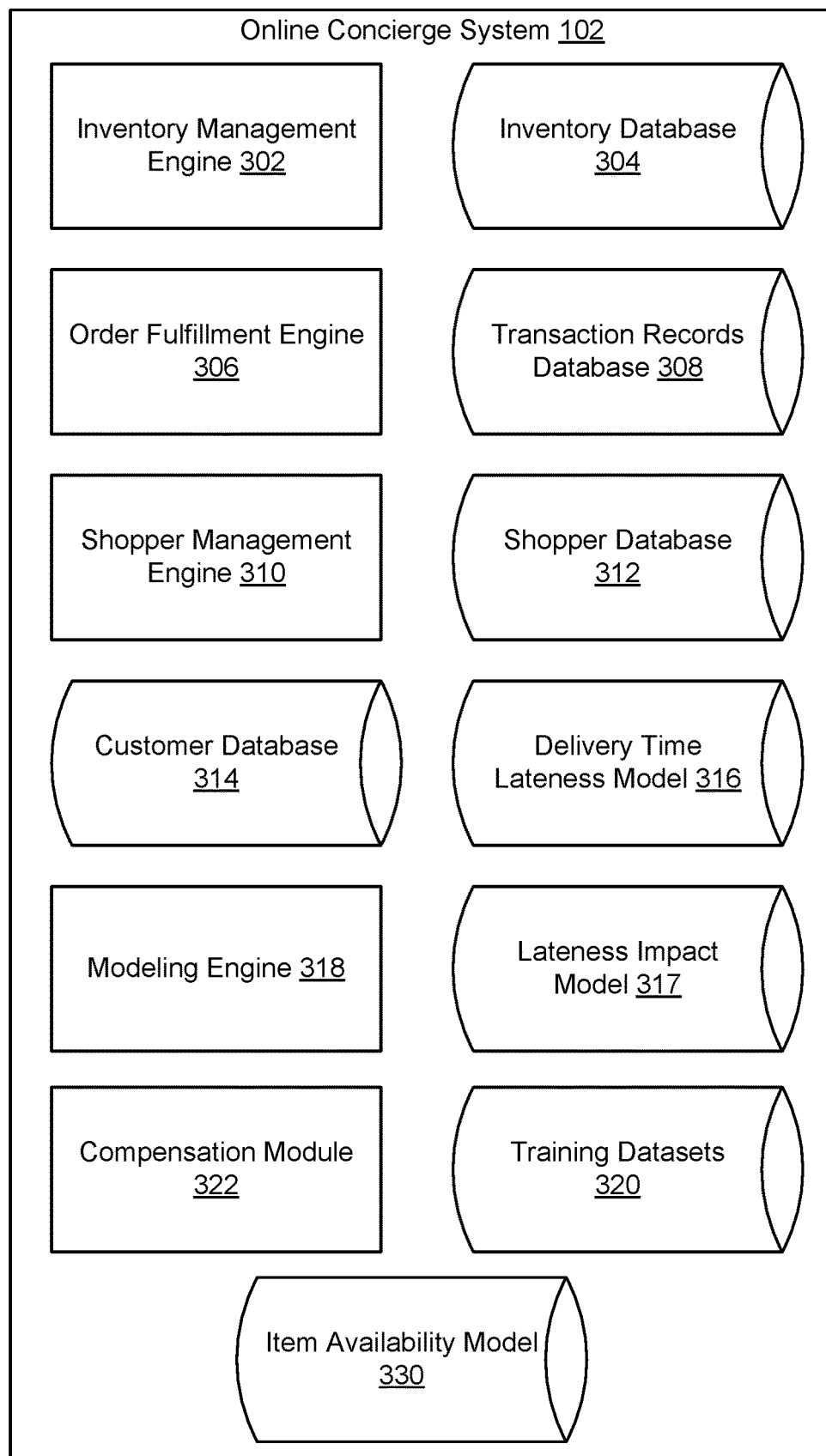
FIG. 3 is a block diagram of an online shopping concierge system, according to one or more embodiments.

FIG. 3 is a diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one or more embodiments, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one or more embodiments, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210. different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 304 with an item availability predicted by the machine-learned item availability model 330. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one or more embodiments, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 206. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one or more embodiments, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one or more embodiments, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model 330, the contents of the order, the inventory of the warehouses, and the proximity to the delivery location. The shopper management engine 310 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfillment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

The online concierge system 102 also includes a compensation module 322 configured to determine a compensation value when an order is received. The compensation value is the value that a shopper or a fulfillment agent will receive for fulfilling the order. In some embodiments, the compensation module 322 determines the compensation value based on a plurality of factors, including (but not limited to) factors related to shopper effort, and factors related to current market condition. The factors related to shopper effort may include (but are not limited to) driver distance from the retailer store or warehouse to the customer, traffic along a route between a warehouse and a customer's address, a number of items in the order, a number of categories that the items belong to. The factors related to the current market condition may include (but are not limited to) a number of shoppers available, skill levels of the available shoppers, day of the week, time of the day, etc.

Machine Learning Models

The online concierge system 102 further includes a machine learning delivery time lateness model 316, a machine learning lateness impact model 317, a modeling engine 318, and training datasets 320. The modeling engine 318 uses the training datasets 320 to generate machine learning delivery time lateness model 316 and/or machine learning lateness impact model 317. The machine-learned item availability model 330 and/or machine learning lateness impact model 317 can learn from the training datasets 320, rather than follow only explicitly programmed instructions.

The delivery time lateness model 316 is trained to take features associated with an order and/or input features associated with currently available delivery agents as input, to repeatedly predict an amount of lateness time that the order will be fulfilled late. Features associated with an order may include (but are not limited to) features associated with shopper effort for fulfilling the order, and features associated with current market conditions. Features associated with the shopper effort may include (but are not limited to) a distance between a warehouse and a customer's address, current traffic along a route between the warehouse and the customer's address, a number of items in the order, a number of categories that the items belong to. The features related to the current market condition may include (but are not limited to) a number of shoppers who are available to fulfill the order, a number of shoppers who have viewed the order, an amount of time passing since the order was received, etc.

The lateness impact model 317 is trained to take features associated with an order, a customer of the order, and a predicted amount of lateness time as input to determine a lateness value based in part on the predicted amount of lateness time. The lateness value indicates a penalty caused by the predicted amount of lateness time. The features associated with the order may include (but are not limited to) a number of items in the order, a number of categories that the items belong to, a number of orders for the customer that were delivered late within a recent time period, whether the customer has posted a negative review in the past, whether the customer has posted a positive review in the past, a percentage of orders for the customer that were delivered late, etc. For example, if the customer has experienced frequent late deliveries, the lateness value of the order may be adjusted to be higher because it is undesirable for a customer to proportionately receive late deliveries. As another example, if the customer has posted a negative review, it is more likely that the customer would post another negative review after experiencing a late delivery. The lateness value of the order may also be adjusted to be higher because a negative review would result in negative publicity.

The compensation module 322 can use the outputs of the delivery time lateness model 316 and the lateness impact model 317 to adjust a compensation value of an order. In some embodiments, the compensation module 322 proposes a plurality of boost amounts. For each of the plurality of boost amounts, the delivery time lateness model 316 is caused to predict a revised amount of lateness time that the order would be delivered late if the compensation value is increased by the boost amount. The lateness impact model 317 is caused to determine a revised lateness value based in part on the predicted revised amount of lateness time. The compensation module 322 then determines an uplift of the boost amount by comparing the revised lateness value with the original lateness value. The compensation module 322 then selects a boost amount from the plurality of boost amounts based in part on the plurality of uplifts. For example, in some embodiments, the compensation module 322 may select the boost amount corresponding to the highest uplift. In some embodiments, the compensation module 322 further considers a relationship between each determined uplift and the corresponding proposed boost amount. For example, The compensation module 322 may be configured to compare the uplift and the corresponding boost amount to compute a net benefit (e.g., net benefit=uplift−boost amount), and select a boost amount that corresponds to a highest net benefit.

The training datasets 320 include a time associated with previous delivery orders. In some embodiments, the training datasets 320 include a day of week, a time of day at which each previous delivery order was placed. Day of week, and/or time of day may impact shopper availability and/or item availability. In some embodiments, the training datasets 320 also include a distance from a warehouse to a customer's address, which the shopper needs to travel back and forth. Generally, a longer distance indicates a greater shopper effort to fulfill the order.

The training datasets 320 may also include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect shopper effort. For example, certain items require a retailer associate's help to obtain, such as fresh meat. As another example, certain items are rarely ordered; thus, most shoppers may not be familiar with an aisle of the warehouse associated with the item. Additionally, if most of the items in an order are within a same department or aisle, it would likely require less effort for a shopper to fulfill the order. On the other hand, if the order includes items in a large number of departments, it would likely require more effort for a shopper to fulfill the order.

The training datasets 320 may include data associated with shoppers, such as a shopper' skill, a number of orders a shopper has successfully fulfilled, a percentage of orders that the shopper has successfully fulfilled, etc. When an order is received, there may be a mixed number of skilled and less skilled shoppers who are available. The number of skilled or unskilled shoppers is related to whether the order is likely to be fulfilled late.

The training datasets 320 may also include appeasement cost when an order is fulfilled late by an amount of lateness time, whether a customer leaves a negative review after an order is fulfilled late by an amount of lateness time, and/or whether a customer stops ordering from the online concierge system after an order is fulfilled late by an amount of lateness time. These data are associated with a lateness value or cost associated with an amount of lateness time by which an order is fulfilled late.

Example Embodiments of Dynamically Boosting Order Delivery Time

Figure 4A:
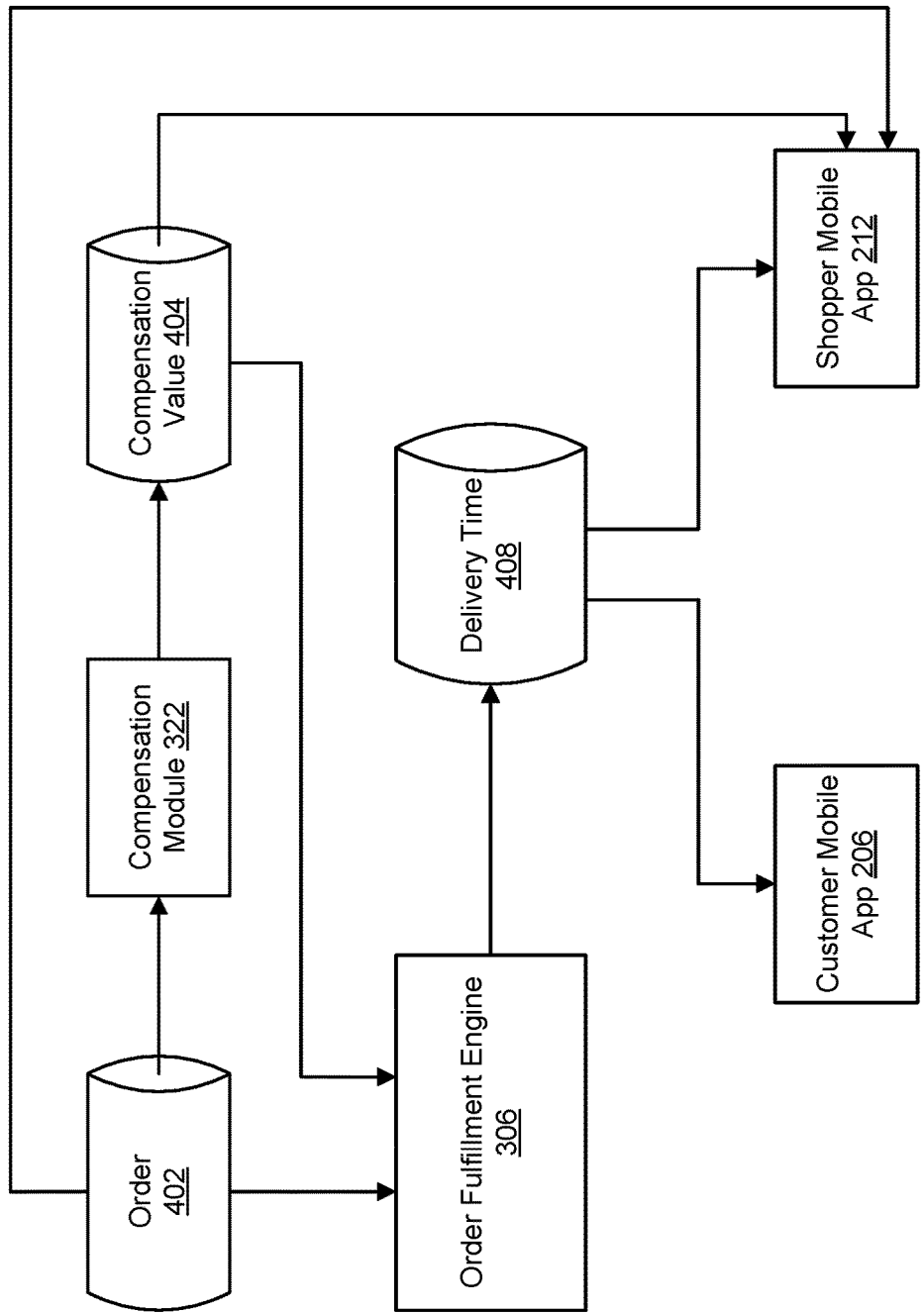
FIG. 4A is a block diagram of an example process of determining a base compensation value and a delivery time when an order is received.

Additional details about the process of dynamically boosting order delivery time are described below with respect to FIGS. 4A-4C. FIG. 4A is a block diagram of an example process 400A of determining a base compensation value and a delivery time when an order 402 is received. As illustrated in FIG. 4A, when order 402 is received, the order fulfillment engine 306 is configured to predict or associate a delivery time 408 with the order 402. The compensation module 322 is configured to determine a compensation value 404 (also referred to as a base compensation value) for the order 402. The base compensation value 404 may be determined based on a number of factors, such as (but not limited to) driver distance from the retailer store or warehouse to the customer, a number of items, a number of categories that the items belong to, day of the week, time of the day, etc. The delivery time 408 is sent to the customer via a customer mobile application 206, a web browser, an email, and/or a text message. Also, the order 402 with the compensation value 404 and the delivery time 408 are published and sent to available shoppers via their shopper mobile applications 212.

If the compensation value 404 is properly priced, the order 402 is likely accepted by one of the available shoppers and fulfilled by the delivery time 408. However, from time to time, an order may be mispriced for a variety of reasons, such as inaccuracy in predicting the effort involved for the order, uncertainty around the tip amount set by the customer (e.g., deliveries with no tip may be unattractive to shoppers, but the online concierge system may not directly observe the tip value for compensation value decisions), a prevailing supply state in a given market, etc. In particular, if the compensation value 404 of the order 402 is underpriced, i.e., is below a target earnings rate for the currently available shoppers, it may not be accepted by shoppers, who favor orders that are not mispriced. To catch such mispriced orders, the online concierge system 102 implements machine learning models (e.g., delivery time lateness model 316 and lateness impact model 317) to repeatedly predict an amount of lateness time that the order 402 will be fulfilled late, and determines a lateness value indicating an impact or penalty caused by the predicted amount of lateness time.

Figure 4B:
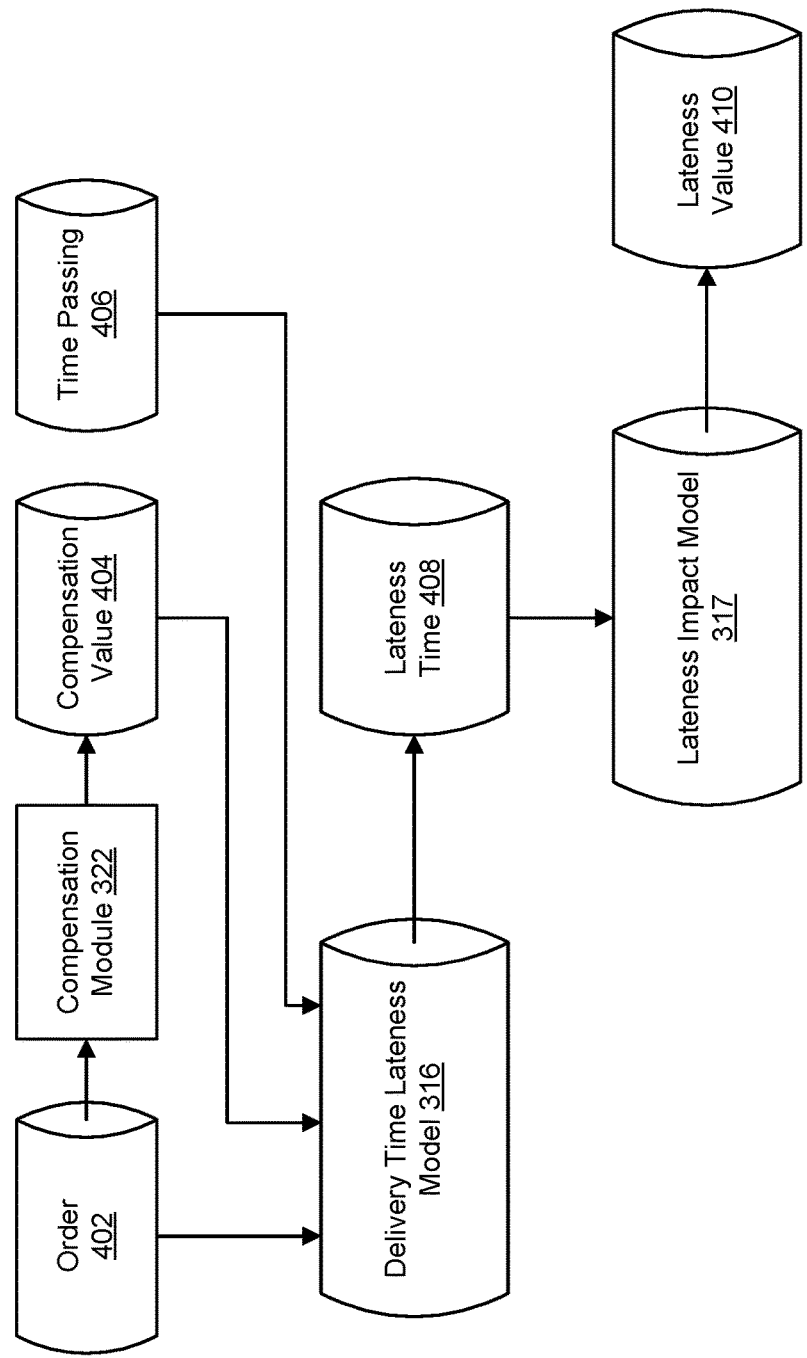
FIG. 4B is a block diagram of an example process of predicting a delivery time and determining a compensation value when an order is received, according to one or more embodiments.

FIG. 4B illustrates an example process 400B of predicting an amount of lateness time that the order 402 will be fulfilled. As illustrated in FIG. 4B, the delivery time lateness model 316 receives information related to the order 402, the compensation value 404, an amount of time passing 406 since the order was received, and/or any other relevant information, and predicts an amount of lateness time 408 based on the received information. The lateness impact model 317 receives the predicted amount of lateness time 408 in addition to information related to the order 402, the compensation value 404, an amount of time passing 406, and any other relevant information, and determines a lateness value 410 based on the received information. The lateness value 410 indicates an impact or a penalty caused by the predicted amount of lateness time 408. The greater the lateness value 410 indicates a greater penalty, as such, it would be beneficial for the online concierge system 102 to boost the compensation value more. Conceptually, a boost amount would be able to reduce the amount of lateness time, which in turn reduces the lateness value. However, the boost amount and the lateness value 410 may not be always in proportion. For example, when a boost amount is greater than a threshold, there may not be any additional impact to the lateness value 410. As another example, too small of a boost amount may also not make any difference to the lateness value 410.

To identify an optimal boost amount, the online concierge system 102 proposes a plurality of boost amounts, and determines an uplift for each of the plurality of boost amounts. The uplift indicates a difference or reduction of the lateness value by the corresponding boost amount. The online concierge system 102 then identifies an optimal boost amount among the plurality of boost amounts.

Figure 4C:
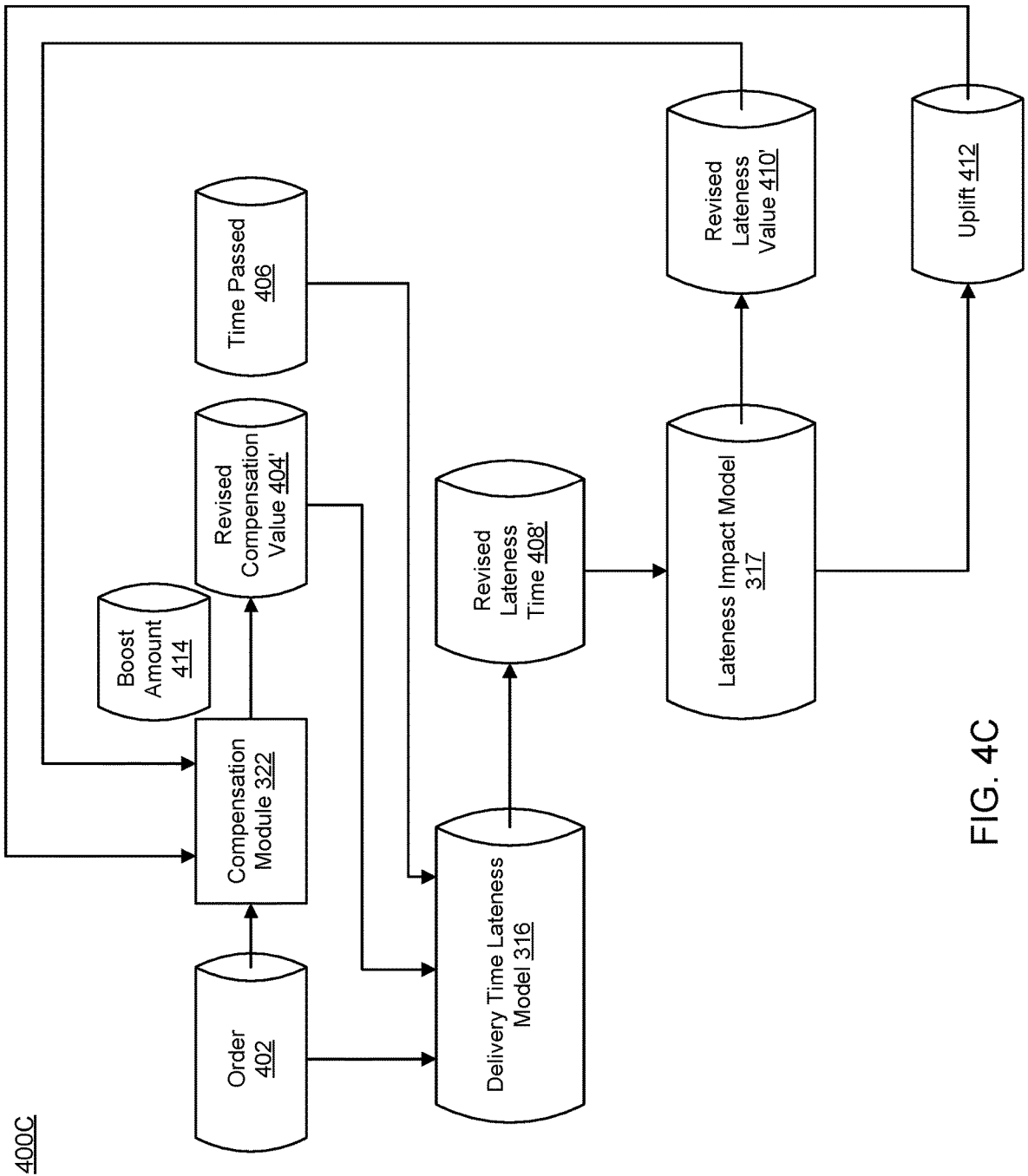
FIG. 4C is a block diagram of an example process of predicting an amount of lateness time and determining a lateness value based on the predicted amount of lateness time, according to one or more embodiments.

FIG. 4C illustrates an example process 400C of identifying an optimal boost amount among a plurality of boost amounts, according to one or more embodiments. As illustrated in FIG. 4C, the compensation module 322 proposes the plurality of boost amounts. For each boost amount 414 in the plurality of boost amounts, the compensation module 322 computes a revised compensation value 404'. The delivery time lateness model 316 then predicts a revised lateness time 408'. The lateness impact model 317 then based on the revised lateness time 408' to determine a revised lateness value 410'. The lateness impact model 317 also compares the revised lateness value 410' with the original lateness value 410 to determine an uplift 412. In some embodiments, the uplift 412 is then compared with the boost amount 414 to determine a net benefit. For example, if the uplift amount is greater than the boost amount, the net benefit is positive, indicating that the boost amount 414 generates an overall positive effect. On the other hand, if the uplift amount is lower than the boost amount, the net benefit is negative, indicating that the boost amount does not generate an overall positive effect.

This process repeats for each of the plurality of proposed boost amounts. In some embodiments, the compensation module 322 ranks each of the uplifts to select the boost amount resulting in the highest uplift. In some embodiments, the compensation module 322 ranks each of the net benefits to select the boost amount resulting in the highest net benefit. In some cases, if none of the net benefits is positive, the compensation module 322 determines that no boost amount is to be applied to the order 402.

Compensation Module

Figure 5:
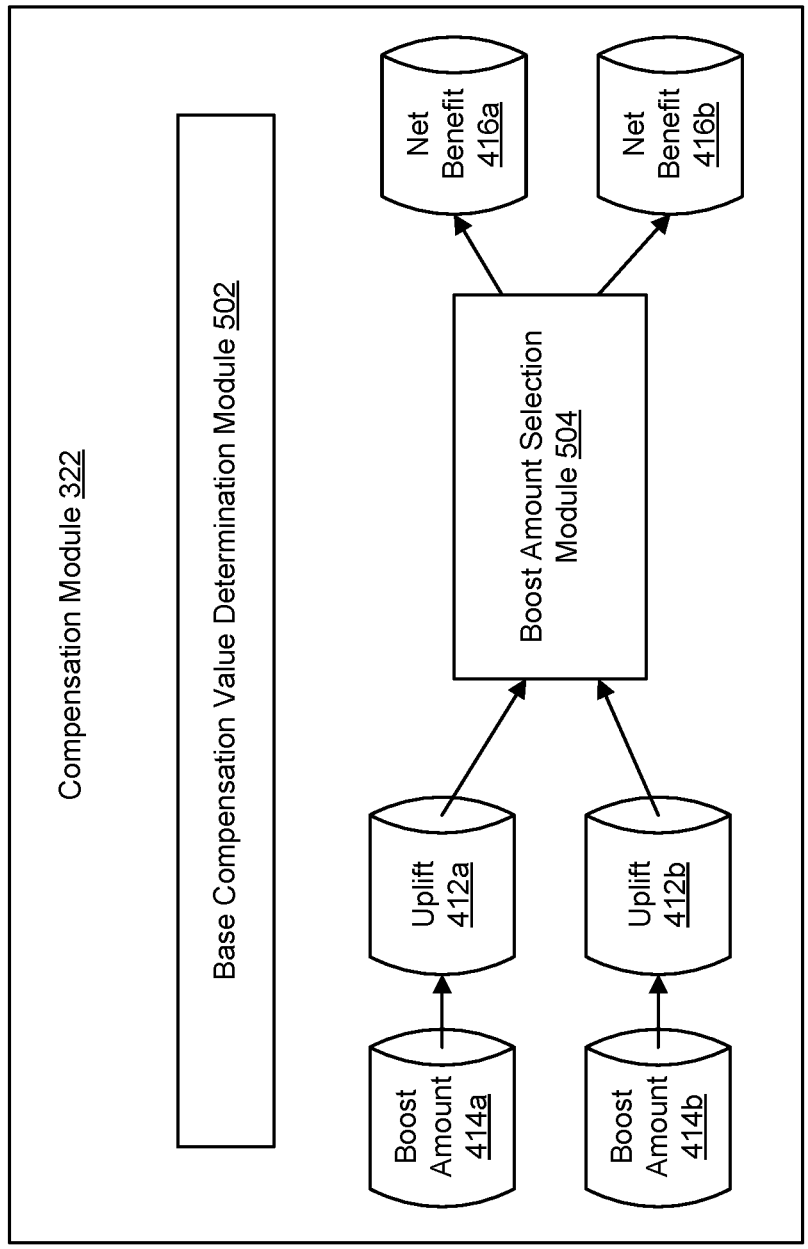
FIG. 5 is a diagram of a process of determining an uplift for a proposed boost amount.

FIG. 5 is a block diagram of the compensation module 322, according to one or more embodiments. The compensation module 322 includes a base compensation value determination module 502 configured to determine a base compensation value when an order is received. The compensation module 322 also includes a boost amount selection module 504 configured to select a boost amount from a plurality of boost amounts 414a, 414b. The compensation module 322 receives a first uplift 412a from the lateness impact model 317, the first uplift 412a corresponding to a first boost amount 414a. The compensation module 322 also receives a second uplift 412b from the lateness impact model 317, the second uplift 412b corresponding to a second boost amount 414b. In some embodiments, the boost amount selection module 504 ranks each of the uplifts 412a, 412b to identify a highest uplift among the plurality of uplifts and selects the boost amount corresponding to the highest uplift, boosting the compensation value by the selected boost amount.

In some embodiments, the boost amount selection module 504 further determines a first net benefit 416a based on the first boost amount 414a and the first uplift 412a, and determines a second net benefit 416b based on the second boost amount 414b and the second uplift 412b. The boost amount selection module 504 ranks each of the net benefits 416a, 416b to identify a highest net benefit, and selects the boost amount corresponding to the highest net benefit, boosting the compensation value by the selected boost amount.

For example, the first boost amount 414a may be 2 dollars, the first uplift 412a may be 4 dollars, as such the first net benefit 416a is 2 dollars. The second boost amount 414b may be 5 dollars, the second uplift 412b may be 6 dollars, as such the second net benefit 415b is 1 dollar. In some embodiments, the compensation module 322 may select a boost amount (i.e., the second boost amount 5 dollars) corresponding to the highest uplift, which is the second uplift 412b (i.e., 6 dollars). Alternatively, the compensation module 322 may select a boost amount (i.e., the first boost amount 2 dollars) corresponding to the highest net benefit, which is the first uplift 412a (i.e., 4 dollars).

Customer Mobile Application

Figure 6A:
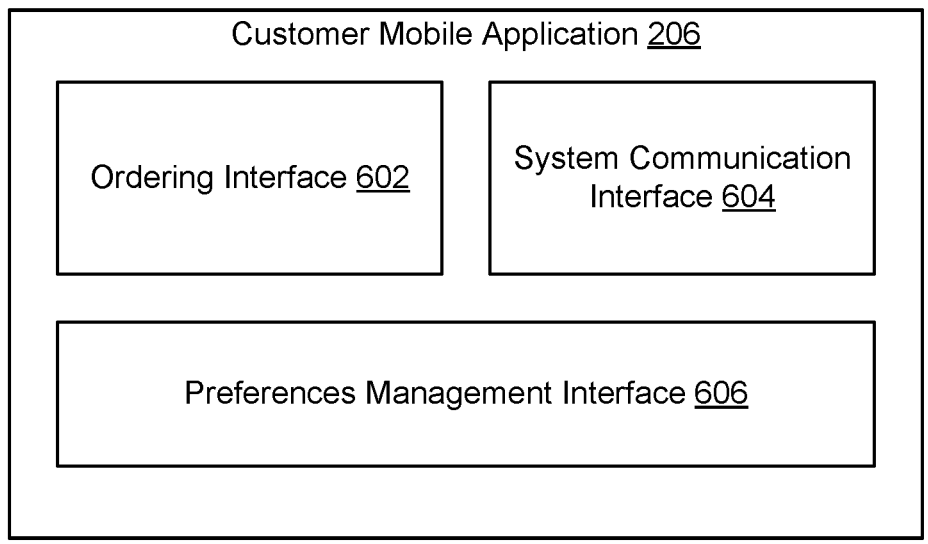
FIG. 6A is a diagram of a customer mobile application (CMA), according to one or more embodiments.

FIG. 6A is a block diagram of the customer mobile application (CMA) 206, according to one or more embodiments. The CMA 206 includes an ordering interface 602, which provides an interactive interface with which the user 204 can browse through and select products and place an order. The CMA 206 also includes a system communication interface 604 which, among other functions, receives inventory information from the online shopping concierge system 102 and transmits order information to the system 102. The CMA 206 also includes a preferences management interface 606 which allows the user 204 to manage basic information associated with his/her account, such as his/her home address and payment instruments. The preferences management interface 606 may also allow the user to manage other details such as his/her favorite or preferred warehouses 210, preferred delivery times, special instructions for delivery, and so on.

Shopper Mobile Application

Figure 6B:
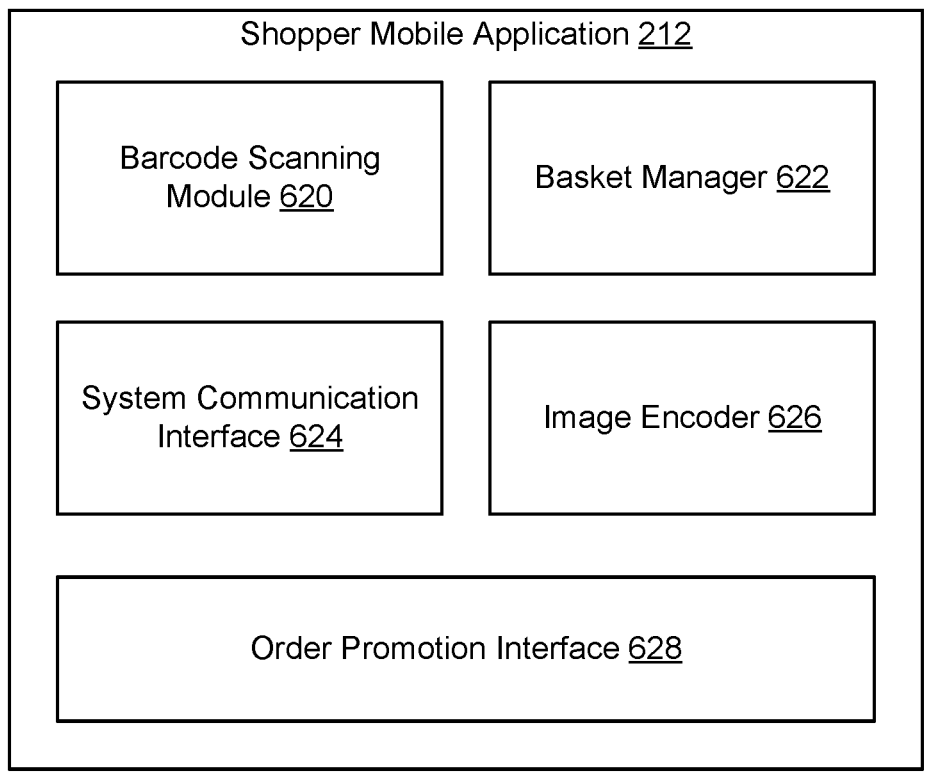
FIG. 6B is a diagram of a shopper mobile application (SMA), according to one or more embodiments.

FIG. 6B is a diagram of the shopper mobile application (SMA) 212, according to one or more embodiments. The SMA 212 includes a barcode scanning module 620 which allows a shopper 208 to scan an item at a warehouse 210 (such as a can of soup on the shelf at a grocery store). The barcode scanning module 620 may also include an interface which allows the shopper 208 to manually enter information describing an item (such as its serial number, SKU, quantity and/or weight) if a barcode is not available to be scanned. SMA 212 also includes a basket manager 622 which maintains a running record of items collected by the shopper 208 for purchase at a warehouse 210. This running record of items is commonly known as a "basket." In one or more embodiments, the barcode scanning module 620 transmits information describing each item (such as its cost, quantity, weight, etc.) to the basket manager 622, which updates its basket accordingly. The SMA 212 also includes a system communication interface 624 which interacts with the online shopping concierge system 102. For example, the system communication interface 624 receives an order from the online concierge system 102 and transmits the contents of a basket of items to the online concierge system 102. The SMA 212 also includes an image encoder 626 which encodes the contents of a basket into an image. For example, the image encoder 626 may encode a basket of goods (with an identification of each item) into a QR code which can then be scanned by an employee of the warehouse 210 at check-out.

In some embodiments, shopper mobile application 212 also includes an order promotion interface 628 configured to promote an order. For example, when a compensation value of an order is increased by a boost amount, the order promotion interface 628 may promote the order via the order promotion interface 628. In some embodiments, a shopper can interact with the promoted order to accept or reject it. The delivery time lateness model 316 of the online concierge system 102 may be caused to re-predict an updated lateness time 408' responsive to receiving a number of rejections from the shopper mobile application 212, which in turn causes the lateness impact model 317 to re-determine an updated lateness value 410' and an uplift 412, which in turn cause the compensation module 322 to select an updated boost amount 414.

Figure 7:
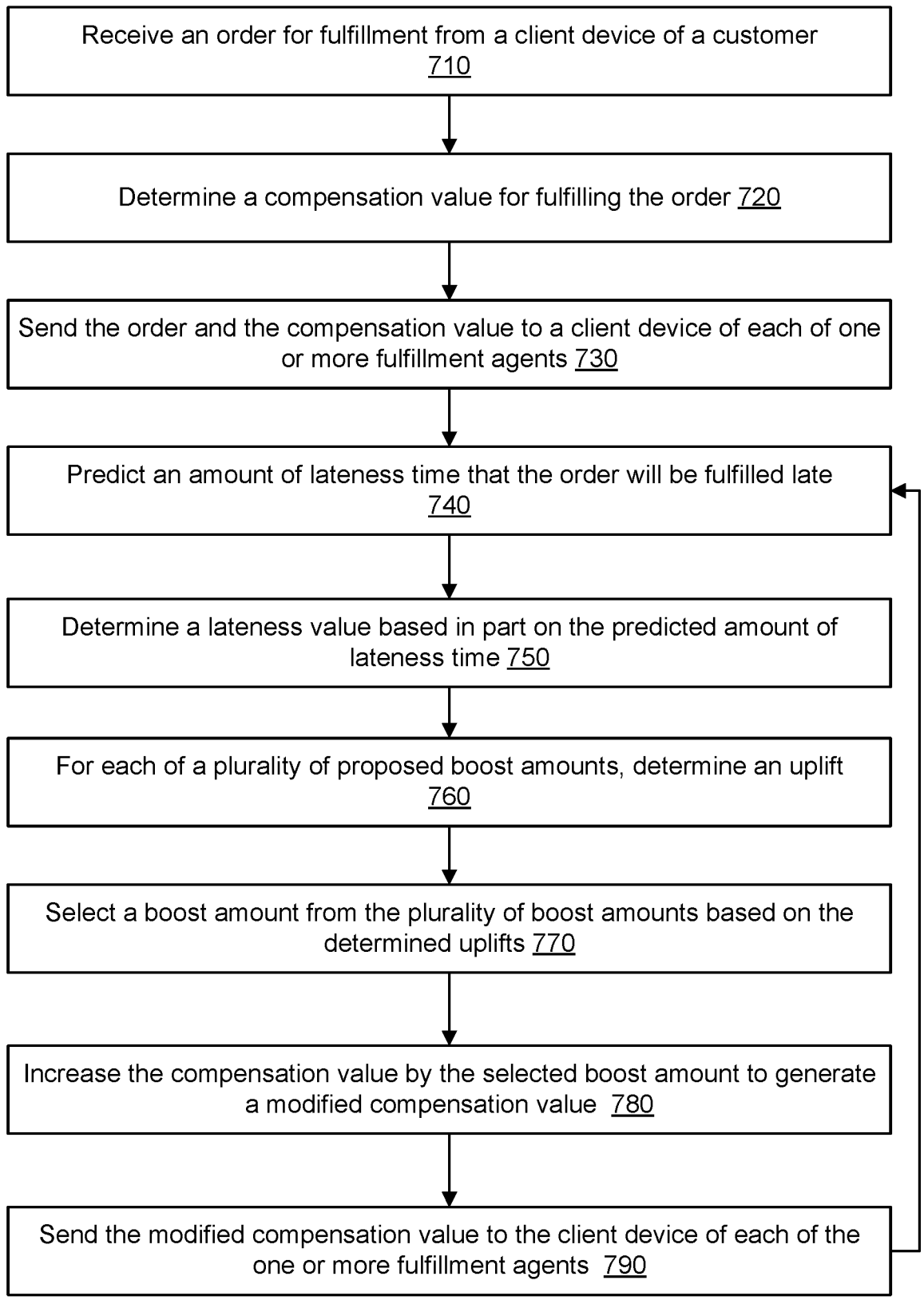
FIG. 7 is a flowchart of an example method for dynamically boosting a compensation value of an order, according to one or more embodiments.

Example Methods for Using Machine Learning Model to Dynamically Boost Order Delivery Time FIG. 7 is a flowchart of one or more embodiments of a method for using a machine learning model to dynamically boost order delivery time. In various embodiments, the method includes different or additional steps than those described in conjunction with FIG. 7. Further, in some embodiments, the steps of the method may be performed in different orders than the order described in conjunction with FIG. 7. The method described in conjunction with FIG. 7 may be carried out by the online concierge system 102 in various embodiments, while in other embodiments, the steps of the method are performed by any online system capable of accessing and applying machine learning models.

The online concierge system 102 receives 710 an order for fulfillment from a client device of a customer. The client device of the customer may have a browser or a customer mobile application 206 installed thereon, allowing the customer to make orders and send orders to the online concierge system 102.

The online concierge system 102 determines 720 a compensation value (which may also be referred to as a base compensation value) for fulfilling the order. The base compensation value may be determined based on a plurality of factors associated with the order, available shoppers, and/or shopper effort for fulfilling the order. The plurality of factors may include (but are not limited to) driver distance from the retailer store or warehouse to the customer, a number of items, a number of categories that the items belong to, day of the week, time of the day, traffic of the area, etc.

The online concierge system 102 sends 730 the order and the compensation value to a client device of each of one or more fulfillment agents that are available. Each client device of the one or more fulfillment agents may have a shopper mobile application 212 installed thereon configured to receive the order and the compensation value associated therewith. If the compensation value is properly priced, the order is likely accepted by one of the fulfillment agents. The shopper mobile application 212 allows the fulfillment agent to view, accept and/or reject the order.

The online concierge system 102 predicts 740 an amount of lateness time that the order will be fulfilled late. In particular, predicting the amount of time that the order will be fulfilled late is performed by applying a machine learning model (also referred to as a first machine learning model) trained based on data associated with historical orders and/or data associated with the currently available shoppers. In some embodiments, the amount of lateness time is quantified into a category among a plurality of categories, based on minute, 5 minutes, etc. In some embodiments, predicting 740 the amount of lateness time is based in part on (1) a number of shoppers who viewed the order, (2) a number of nearby shoppers that are within a distance of a retailer associated with the order, (3) historical data of the number of nearby shoppers, (4) a number of items in the order, (5) a number of categories that the items belong to, and (6) a distance between a customer's address and a store location where the order will be fulfilled.

The online concierge system 102 determines 750 a lateness value based in part on the predicted amount of lateness time. In some embodiments, determining the lateness value based in part on the predicted amount of lateness time is also performed by applying a machine learning model (also referred to "a second machine learning model") trained based on data associated with historical orders and customers. In some embodiments, the second machine learning model is trained to take input features associated with the order and input features associated with the customer (e.g., historical orders associated with the customer, whether the customer has submitted positive or negative reviews, etc.). In some embodiments, determining 750 the lateness value is based in part on (1) an appeasement cost if the order is fulfilled late by the predicted amount of lateness, (2) an expected decrease in a customer lifetime value if the order is fulfilled late by the predicted amount of lateness, and (3) a retention rate of customers in relation to an order delivered late by the amount of lateness time.

For each of a plurality of proposed boost amounts, the online concierge system 102 then determines 760 an uplift, which is a reduction of the lateness value resulting from the corresponding boost amount. The online concierge system 102 selects 770 a boost amount from the plurality of boost amounts based in part on the determined uplifts. The online concierge system 102 increases 780 the compensation value by the selected boost amount. The online concierge system 102 sends 790 the increased compensation value to the client device of each of the one or more available fulfillment agents, causing the order to be accepted sooner by a fulfillment agent to thereby boost order delivery time.

If the increased compensation value is properly priced, the order should be accepted by a fulfillment agent soon. However, if the order is still not accepted by a fulfillment agent for a time period, the online concierge system 102 may re-predict 740 an updated amount of lateness time that the order will be fulfilled late again, re-determine 750 an updated lateness value based in part on the updated amount of lateness time, re-determine 760 an updated uplift for each of a plurality of proposed boost amounts, select 770 an updated boost amount from the plurality of boost amounts, increase 780 the compensation value again by the selected boost amount, and send 790 the increased compensation value to the client device of each of the one or more fulfillment agents. This process may repeat as many times as necessary until the order is accepted by a fulfillment agent.

In some embodiments, the amount of lateness time may be used to modify predicted lateness time for a later received order. For example, when a second order is received, the online concierge system 102 predicts a second amount of lateness time of the second order based in part on the predicted amount of lateness time that the previous order will be fulfilled late.

Figure 8:
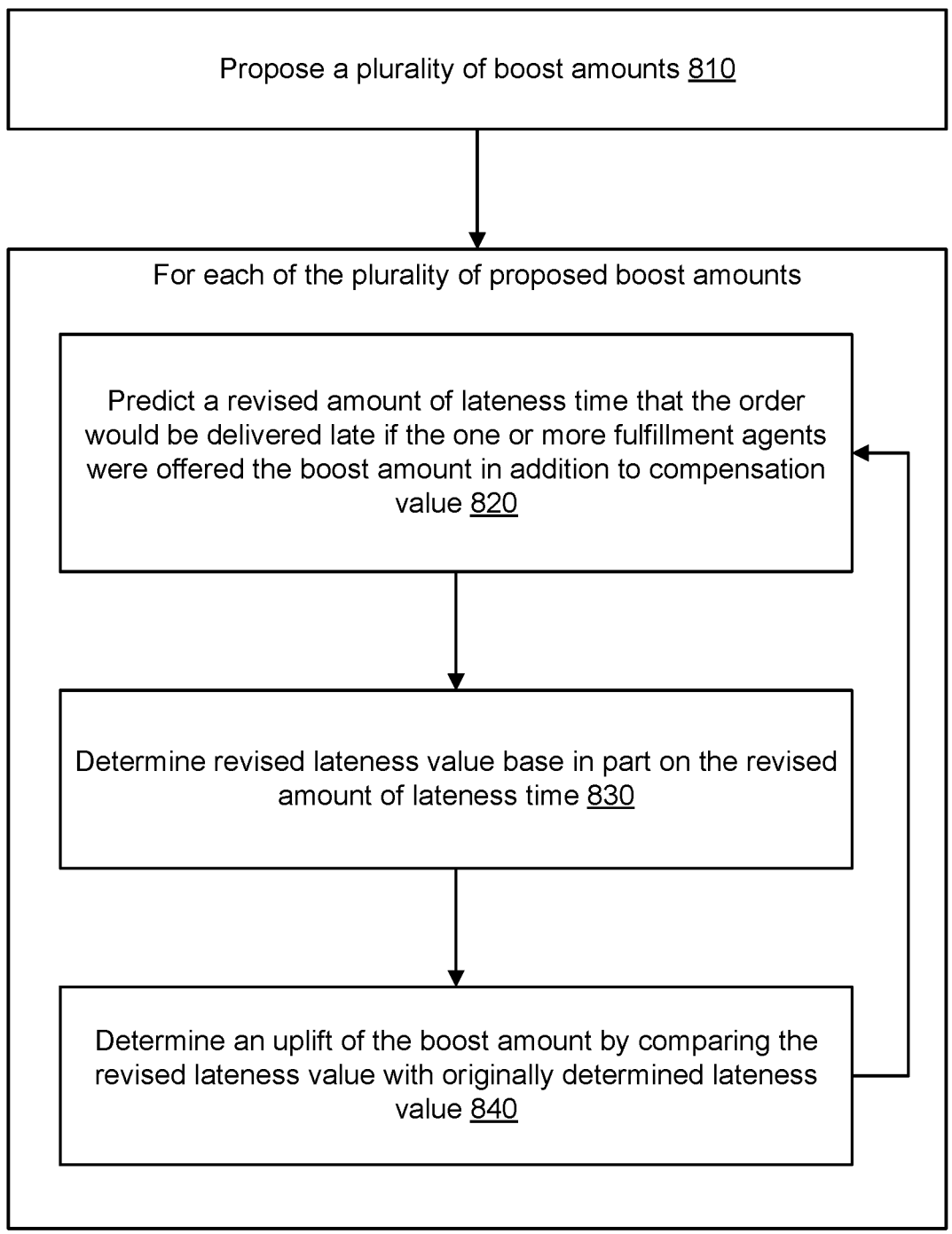
FIG. 8 is a flowchart of an example method for determining an uplift for each of a plurality of proposed boost amounts, according to one or more embodiments.

FIG. 8 is a flowchart of one or more embodiments of a method 800 for determining an uplift for each of a plurality of proposed boost amounts, which corresponds to step 760 of method 700 in FIG. 7. In various embodiments, the method includes different or additional steps than those described in conjunction with FIG. 8. Further, in some embodiments, the steps of the method may be performed in different orders than the order described in conjunction with FIG. 8.

The online concierge system 102 proposes 810 a plurality of boost amounts. In some embodiments, the plurality of boost amounts may be a predetermined set of boost amounts. In some embodiments, the plurality of boost amounts may be on an interval of a quantified amount, such as a dollar, 2 dollars, or 5 dollars. For each of the plurality of proposed boost amounts, the online concierge system 102 predicts 820 a revised amount of lateness time that the order would be delivered late if the one or more fulfillment agents were offered the boost amount in addition to the base compensation value. The online concierge system 102 then determines 830 a revised lateness value based in part on the revised amount of lateness time. The online concierge system 102 then determines 840 an uplift of the boost amount by comparing the revised lateness value with originally determined lateness value.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, at one or more computing systems:
    receiving an order for fulfillment from a client device of a customer, the order associated with a delivery time by which the order is to be fulfilled;
    sending the order, the delivery time, and a compensation value for fulfilling the order to a client device of each of one or more fulfillment agents;
    predicting an amount of lateness time that the order will be fulfilled late, wherein predicting the amount of lateness time comprises applying a trained machine-learning model to the order, and the trained machine-learning model is trained on training examples, each training example including input features associated with a historical order and input features associated with the one or more fulfillment agents labeled with an amount of lateness time indicating a time past the delivery time that the order is expected to be fulfilled, training the machine learning model including:
        applying the machine learning model to the training examples to predict an amount of lateness time;
        determining an error metric indicating a difference between the predicted amount of lateness time and the labeled amount of lateness time; and
        adjusting parameters of the machine learning model to reduce the error metric;
    determining a lateness value based in part on the predicted amount of lateness time, the lateness value indicating a penalty caused by the predicted amount of lateness time;
    for each of a plurality of proposed boost amounts, determining an uplift by:
        predicting a revised amount of lateness time that the order would be delivered late if the one or more fulfillment agents were offered the boost amount in addition to the compensation value,
        determining a revised lateness value based in part on the predicted revised amount of lateness time, and
        determining the uplift by comparing the revised lateness value with the lateness value;
    selecting a boost amount from the plurality of boost amounts based on the determined uplifts; and
    resending the order and a modified compensation value increased by the selected boost amount to the client device of each of the one or more fulfillment agents, causing the order to be accepted sooner by a fulfillment agent to thereby boost order delivery time.

2. The method of claim 1, wherein predicting an amount of lateness time that the order will be fulfilled late is performed only when the order is not accepted by a fulfillment agent after a time period.

3. The method of claim 1, wherein predicting an amount of lateness time that the order will be fulfilled late is performed periodically before the order is accepted by a fulfillment agent.

4. The method of claim 1, comprising:
quantifying the amount of lateness time into a category among a plurality of categories, wherein the lateness value is determined based on the category.

5. The method of claim 1, wherein predicting the amount of lateness time is based in part on (1) a number of shoppers who viewed the order, (2) a number of nearby shoppers that are within a distance of a retailer associated with the order, (3) historical data of the number of nearby shoppers, (4) a number of items in the order, (5) a number of categories that the items belong to, and (6) a distance between a customer's address and a store location where the order will be fulfilled.

6. The method of claim 1, wherein determining the lateness value comprises applying a second trained model to the order and the predicted amount of lateness time, and the second trained model is configured to receive input features associated with the order and input features associated with the customer to output a cost, in which fulfilling the order late by the predicted amount of lateness time is likely to result.

7. The method of claim 1, wherein determining the lateness value is based in part on (1) an appeasement cost if the order is fulfilled late by the predicted amount of lateness, (2) an expected decrease in a customer lifetime value if the order is fulfilled late by the predicted amount of lateness, and (3) a retention rate of customers in relation to an order delivered late by the amount of lateness time.

8. The method of claim 1, comprising:
receiving a second order for fulfillment from a second client device of a second customer; and
predicting a second amount of lateness time of the second order based in part on the predicted amount of lateness time that the order will be fulfilled late.

9. A computer program product comprising a non-transitory computer readable storage medium having instructions encoded thereon that, when executed by a processor, cause the processor to:
receive an order for fulfillment from a client device of a customer, the order associated with a delivery time by which the order is to be fulfilled;
send the order, the delivery time, and a compensation value for fulfilling the order to a client device of each of one or more fulfillment agents;
predict an amount of lateness time that the order will be fulfilled late, wherein predicting the amount of lateness time comprises applying a trained machine-learning model to the order, and the trained machine-learning model is trained on training examples, each training example including input features associated with a historical order and input features associated with the one or more fulfillment agents labeled with an amount of lateness time indicating a time past the delivery time that the order is expected to be fulfilled, training the machine learning model including:
applying the machine learning model to the training examples to predict an amount of lateness time;
determining an error metric indicating a difference between the predicted amount of lateness time and the labeled amount of lateness time; and
adjusting parameters of the machine learning model to reduce the error metric;
determine a lateness value based in part on the predicted amount of lateness time, the lateness value indicating a penalty caused by the predicted amount of lateness time;
for each of a plurality of proposed boost amounts, determine an uplift by:
predicting a revised amount of lateness time that the order would be delivered late if the one or more fulfillment agents were offered the boost amount in addition to the compensation value,
determining a revised lateness value based in part on the predicted revised amount of lateness time, and
determining the uplift by comparing the revised lateness value with the lateness value;
select a boost amount from the plurality of boost amounts based on the determined uplifts; and
resend the order and a modified compensation value increased by the selected boost amount to the client device of each of the one or more fulfillment agents, causing the order to be accepted sooner by a fulfillment agent to thereby boost order delivery time.

10. The computer program product of claim 9, wherein predicting an amount of lateness time that the order will be fulfilled late is performed only when the order is not accepted by a fulfillment agent after a time period.

11. The computer program product of claim 9, wherein predicting an amount of lateness time that the order will be fulfilled late is performed periodically before the order is accepted by a fulfillment agent.

12. The computer program product of claim 9, the non-transitory computer readable storage medium having additional instructions encoded thereon that, when executed by the processor, cause the processor to:
quantify the amount of lateness time into a category among a plurality of categories, wherein the lateness value is determined based on the category.

13. The computer program product of claim 9, wherein predicting the amount of lateness time is based in part on (1) a number of shoppers who viewed the order, (2) a number of nearby shoppers that are within a distance of a retailer associated with the order, (3) historical data of the number of nearby shoppers, (4) a number of items in the order, (5) a number of categories that the items belong to, and (6) a distance between a customer's address and a store location where the order will be fulfilled.

14. The computer program product of claim 9, wherein determining the lateness value comprises applying a second trained model to the order and the predicted amount of lateness time, and the second trained model is configured to receive input features associated with the order and input features associated with the customer to output a cost, in which fulfilling the order late by the predicted amount of lateness time is likely to result.

15. The computer program product of claim 9, wherein determining the lateness value is based in part on (1) an appeasement cost if the order is fulfilled late by the predicted amount of lateness, (2) an expected decrease in a customer lifetime value if the order is fulfilled late by the predicted amount of lateness, and (3) a retention rate of customers in relation to an order delivered late by the amount of lateness time.

16. The computer program product of claim 9, the non-transitory computer readable storage medium having additional instructions encoded thereon that, when executed by the processor, cause the processor to:
receive a second order for fulfillment from a second client device of a second customer; and
predict a second amount of lateness time of the second order based in part on the predicted amount of lateness time that the order will be fulfilled late.

17. A computing system, comprising:
a processor; and
a non-transitory computer readable storage medium having instructions encoded thereon that, when executed by the processor, cause the processor to:
receive an order for fulfillment from a client device of a customer, the order associated with a delivery time by which the order is to be fulfilled;
send the order, the delivery time, and a compensation value for fulfilling the order to a client device of each of one or more fulfillment agents;
predict an amount of lateness time that the order will be fulfilled late, wherein predicting the amount of lateness time comprises applying a trained machine-learning model to the order, and the trained machine-learning model is trained on training examples, each training example including input features associated with a historical order and input features associated with the one or more fulfillment agents labeled with an amount of lateness time indicating a time past the delivery time that the order is expected to be fulfilled, training the machine learning model including:
applying the machine learning model to the training examples to predict an amount of lateness time;
determining an error metric indicating a difference between the predicted amount of lateness time and the labeled amount of lateness time; and
adjusting parameters of the machine learning model to reduce the error metric;
determine a lateness value based in part on the predicted amount of lateness time, the lateness value indicating a penalty caused by the predicted amount of lateness time;
for each of a plurality of proposed boost amounts, determine an uplift by:
predicting a revised amount of lateness time that the order would be delivered late if the one or more fulfillment agents were offered the boost amount in addition to the compensation value,
determining a revised lateness value based in part on the predicted revised amount of lateness time, and
determining the uplift by comparing the revised lateness value with the lateness value;
select a boost amount from the plurality of boost amounts based on the determined uplifts; and
resend the order and a modified compensation value increased by the selected boost amount to the client device of each of the one or more fulfillment agents, causing the order to be accepted sooner by a fulfillment agent to thereby boost order delivery time.

18. The computing system of claim 17, wherein predicting an amount of lateness time that the order will be fulfilled late is performed only when the order is not accepted by a fulfillment agent after a time period.

19. The computing system of claim 17, wherein predicting an amount of lateness time that the order will be fulfilled late is performed periodically before the order is accepted by a fulfillment agent.

20. The computing system of claim 17, wherein determining the lateness value comprises applying a second trained model to the order and the predicted amount of lateness time, and the second trained model is configured to predict a cost, in which fulfilling the order late by the predicted amount of lateness time would result.

* * * * *